United States Patent [19]

Ishikawa et al.

[11] Patent Number: 5,427,389

[45] Date of Patent: Jun. 27, 1995

[54] METAL LAMINATE GASKET WITH EDGE SUPPORT BEADS

[75] Inventors: Itsuo Ishikawa, Tokyo; Tsunekazu Udagawa, Ichikawa, both of Japan

[73] Assignee: Ishikawa Gasket Co., Ltd., Tokyo, Japan

[21] Appl. No.: 98,004

[22] Filed: Jul. 29, 1993

[30] Foreign Application Priority Data

Jul. 31, 1992 [JP] Japan ................ 4-059500 U

[51] Int. Cl.⁶ .................................. F16J 15/08
[52] U.S. Cl. .................... 277/235 B; 277/236
[58] Field of Search ............. 277/235 B, 180, 236, 277/233

[56] References Cited

U.S. PATENT DOCUMENTS

| | | | |
|---|---|---|---|
| 2,679,241 | 5/1954 | Dickson | 277/180 |
| 3,352,564 | 11/1967 | Johnson | 277/235 B |
| 3,794,333 | 2/1974 | Czernik et al. | 277/180 |
| 4,739,999 | 4/1988 | Ishii et al. | |
| 4,750,749 | 6/1988 | Nicholson | 277/235 B |
| 4,807,892 | 2/1989 | Udagawa | |
| 5,199,723 | 4/1993 | Udagawa | 277/235 B |

FOREIGN PATENT DOCUMENTS

| | | | |
|---|---|---|---|
| 0158956 | 6/1953 | Australia | 277/235 B |
| 0977382 | 11/1975 | Canada | 277/235 B |
| 2176450 | 10/1973 | France | |
| 2668542 | 4/1992 | France | |
| 0883267 | 11/1961 | United Kingdom | 277/235 B |
| 2226371 | 6/1990 | United Kingdom | 277/235 B |

*Primary Examiner*—Daniel G. DePumpo
*Attorney, Agent, or Firm*—Kanesaka & Takeuchi

[57] ABSTRACT

A metal laminate gasket of the invention is used for an internal combustion engine formed of a cylinder head and a cylinder block. The gasket is basically formed of two metal plates laminated together. The gasket has a rectangular shape, and includes a plurality of cylinder bores arranged in a longitudinal direction of the gasket, and a plurality of bolt holes arranged to surround the cylinder bores. The gasket has two lateral side portions, each being defined between a lateral edge and a line linking centers of bolt holes located adjacent to the lateral edge. At least two edge support beads are integrally formed on at least one of the plates. The edge support beads are formed at the lateral side portions to substantially completely support tightening pressure of the bolts applied to the lateral side portions. Thus, deformation of the cylinder head is prevented, and substantially equal tightening pressure can be formed around the entire cylinder bores.

7 Claims, 1 Drawing Sheet ent of a metal plate for constituting a metal laminate gasket of the invention;

METAL LAMINATE GASKET WITH EDGE SUPPORT BEADS

BACKGROUND OF THE INVENTION AND RELATED ART STATEMENT

The present invention relates to a metal laminate gasket with edge support beads to prevent upward expansion or deformation of a cylinder head of an engine.

In an engine having a plurality of cylinder bores arranged in one or a longitudinal direction, a plurality of bolt holes are arranged to surround the respective cylinder bores to tightly seal therearound. A gasket to be installed in this engine includes a plurality of sealing means around the cylinder bores, at which high surface pressure is formed when the gasket is tightened.

When the gasket is tightened between a cylinder head and a cylinder block by bolts, sealing means situated around the respective cylinder bores are compressed. In this respect, a bolt located in a middle portion of the engine operates to tighten two, i.e. right and left, longitudinal sides of the sealing means relative to the bolt. However, a bolt at the longitudinal end of the engine operates to tighten only one side of the sealing means, not two sides. Thus, the bolts at the longitudinal ends operate to tighten the sealing means at a pressure generally twice as much as that at the middle portion of the sealing means.

The unbalanced tightening pressure causes the middle portion of the cylinder head to project upwardly. As a result, equal sealing pressure is not obtained at the sealing means.

In U.S. Pat. No. 4,834,399, a bead is formed around the entire edge portion of the gasket. However, since the bead completely surrounds the edge portion of the gasket, the bead supports all the surface pressure applied by the bolts. Namely, the bead does not support required portions.

Accordingly, one object of the invention is to provide a metal laminate gasket, which can provide by tightening bolts substantially equal surface pressure to all sealing means formed around the cylinder bores.

Another object of the invention is to provide a metal laminate gasket as stated above, which can substantially prevent deformation of a cylinder head caused by unbalanced surface pressure on the sealing means.

A further object of the invention is to provide a metal laminate gasket as stated above, which can be easily and economically manufactured.

Further objects and advantages of the invention will be apparent from the following description of the invention.

SUMMARY OF THE INVENTION

In accordance with the present invention, a metal laminate gasket is used for an internal combustion engine formed of a cylinder head and a cylinder block. The gasket is basically formed of two metal plates laminated together.

The gasket has a rectangular shape, and includes a plurality of cylinder bores arranged along a longitudinal direction of the gasket, and a plurality of bolt holes arranged to surround the cylinder bores. The gasket has two lateral side portions, each being defined between the lateral edge and a line linking centers of bolt holes located adjacent to the lateral edge.

In the gasket of the invention, at least two edge support beads are integrally formed on at least one of the plates. The edge support beads are formed at the lateral side portions to substantially completely support tightening pressure of the bolts applied to the lateral side portions. Thus, deformation of the cylinder head is prevented, and substantially equal tightening pressure can be formed around the entire cylinder bores.

In this respect, if the edge support beads are not formed at the lateral side portions, the lateral side portions are strongly compressed by the bolts. Thus, the middle portion of the cylinder head is liable to project upwardly. Thus, the sealing means for the cylinder bores can not be compressed equally, and gas leakage may occur.

In the present invention, since the deformation of the cylinder head is well prevented, the sealing means can be substantially completely compressed. Gas leakage is well prevented.

Preferably, the edge support bead extends substantially completely along the lateral side portion outside the bolt openings. However, the edge support bead may be formed of a plurality of small beads extending in a longitudinal direction of the engine.

The edge support bead may include side beads at both ends thereof. Each side bead is located in a longitudinal side portion of the gasket defined between the longitudinal edge and a bolt hole adjacent thereto. The side bead does not extend beyond a line extending through a center of a cylinder bore located at a longitudinal end of the gasket and perpendicular to the longitudinal direction of the gasket. As a result, the side bead does not affect the surface pressure obtained by other bolts.

The edge support bead may be curved to have wave portions to widely cover the lateral side portion. The waved bead may be combined with a plurality of small beads without overlapping the wave portions.

In the present invention, all the beads may be formed on one metal plate, or formed in different plates. It is important that the beads are substantially located at the lateral side portion outside the bolt holes. If the beads extend outside the lateral side portions except for the above side beads, such bead affects the sealing means, so that the sealing means can not provide equal surface pressure around the cylinder bores. The edge support beads of the invention are formed at portions affected only by bolt at lateral ends of the gasket.

DETAILED DESCRIPTION OF PREFERRED EMBODIMENTS

Figure 1:
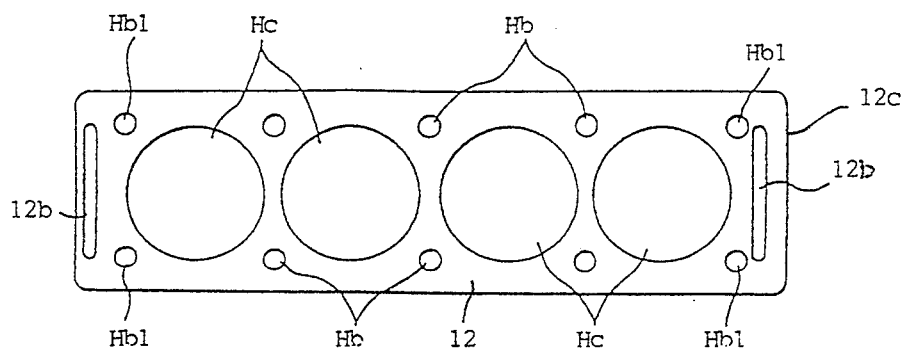
FIG. 1 is an explanatory plan view of a first embodiment of a metal plate for constituting a metal laminate gasket of the invention.
Figure 2:
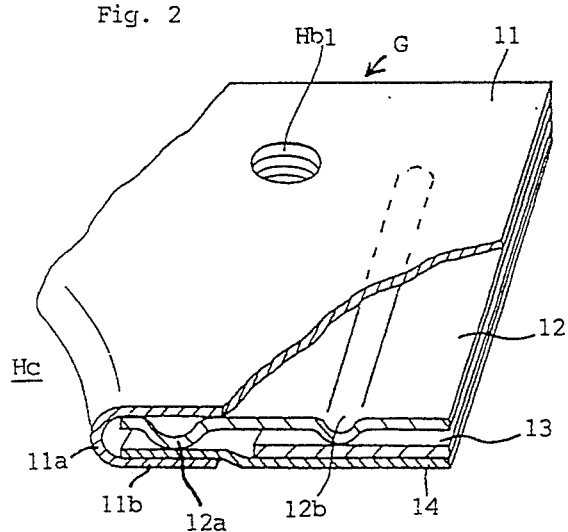
FIG. 2 is a partly cut perspective section view of a metal laminate gasket including the metal plate of FIG. 1.

Referring to FIGS. 1 and 2, a metal laminate gasket G of the invention is shown. The gasket G is a cylinder head gasket and includes four cylinder bores Hc, water holes (not shown), oil holes (not shown), bolt holes Hb, Hb1, and so on, as in the conventional gasket.

The gasket G is formed of an upper plate 11, middle plates 12, 13, and a lower plate 14. The upper plate 11 includes a curved portion 11a and a flange 11b around the cylinder bore Hc, and the middle plate 12 includes a sealing bead 12a around the cylinder bore Hc (the bead 12a is omitted in FIG. 1). When the gasket G is situated between a cylinder head and a cylinder block (both not shown) and is tightened, the bead 12a is compressed to seal around the cylinder bore Hc.

In the gasket G, the cylinder bores Hc are arranged along a longitudinal direction, and the bolt holes Hb, Hb1 are arranged to surround the cylinder bores Hc. In this engine, when the gasket G is tightened, each bolt (not shown) inserted in the bolt hole Hb provides surface pressure for sealing portions of two cylinder bores, while each bolt (not shown) inserted in the bolt hole Hb1 provides surface pressure for sealing a portion of only one cylinder bore.

If the gasket is tightened at the same torque by the bolts, the surface pressure formed around the bolt hole Hb becomes nearly half of the surface pressure formed around the bolt hole Hb1. Namely, the two lateral side portions of the cylinder head gasket are tightened stronger than the middle portion of the gasket.

In the above case, the middle portion of the cylinder head has a space relative to the cylinder block greater than that at the lateral side portions of the cylinder head. Namely, the middle portion of the cylinder head projects upwardly. Since the cylinder head deforms slightly as stated above, the sealing means for the cylinder bores can not receive equal surface pressure.

In the present invention, in order to provide equal surface pressure even at the bolts around the bolt holes Hb1, the middle plate 12 is provided with edge support beads 12b at the lateral side portions of the gasket G. The lateral side portion is a portion surrounded between an edge 12c and a line linking between two bolt holes Hb1 near the edge 12c.

Since the edge support bead 12b is located at the lateral side portion, the tightening pressure by the bolt in the bolt holes Hb1 is applied to the edge support bead 12b as well, so that the surface pressure by the bolt at the bolt hole Hb1 can provide the surface pressure as in the other portions.

As a result, since the cylinder head is not strongly tightened at the lateral side portions thereof, the cylinder head does not deform such that the middle portion projects upwardly. Thus, the sealing means can be compressed substantially equally. Gas leakage does not occur by unbalanced surface pressure of the sealing means.

Figure 3:
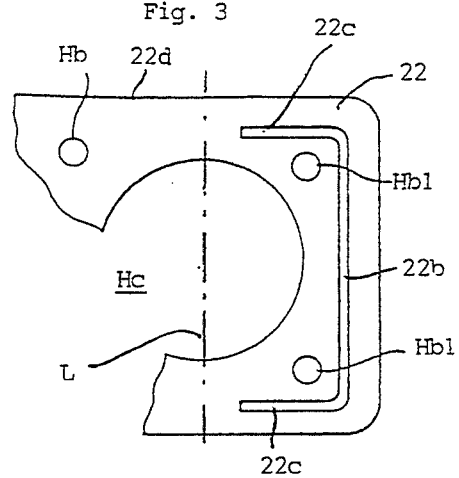
FIGS. 3-6 are plan views of second to fifth embodiments of metal plates for constituting the gaskets of the invention.

FIG. 3 shows a metal plate 22 similar to the plate 12 shown in FIGS. 1 and 2. The plate 22 includes edge support beads 22b at lateral side portions of the plate 22. The bead 22b includes side beads 22c situated along the longitudinal direction of the plate 22. The side bead 22c extends near a half distance between the bolt holes Hb and Hb1. The side bead 22c does not extend beyond a line L, which extends through a center of the cylinder bore Hc and perpendicular to the longitudinal direction of the gasket. Because, if the side bead 22c extends beyond the line L, it affects the surface pressure by the bolt inserted in the bolt hole Hb.

In the plate 22, each side bead 22c is located at a portion between a longitudinal edge 22d and the bolt hole Hb1, so that the beads 22c prevent deformation of the cylinder head from projecting upwardly in a direction perpendicular to the longitudinal direction of the gasket. The bead 22b with the side beads 22c prevents deformation of the cylinder head.

Figure 4:
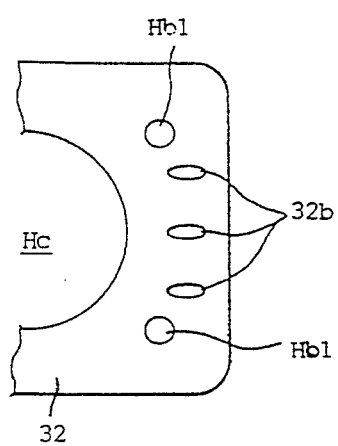

FIG. 4 shows a metal plate 32, similar to the metal plate 12. The metal plate 32 includes three edge support beads 32b at each lateral side portion thereof. The beads 32b are arranged to be spaced apart from each other and extend along the longitudinal direction of the plate 32. The beads 32b operate as in the bead 12b.

Figure 5:
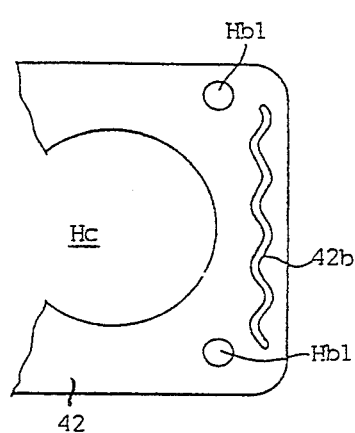

FIG. 5 shows a metal plate 42, similar to the metal plate 12. The metal plate 42 includes an edge support bead 42b in a wave or corrugated form at each lateral side portion. The bead 42b is formed relatively widely in the lateral side portion. The bead 42b operates as in the bead 12b.

Figure 6:
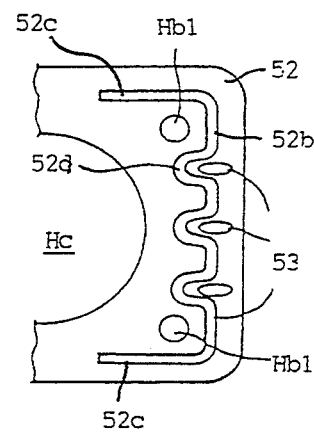

FIG. 6 shows a metal plate 52, similar to the metal plate 12, which includes an edge support bead 52b and three small beads 53 at each lateral side portion. The bead 52b includes side beads 52c and curved portions 52d. The side beads 52c operate to support a side portion, as in the side bead 22c, and the curved portions 52d and the small beads 53 support the lateral side portion.

In the metal plate 52, the bead 52b and the small beads 53 are formed in one plate. However, it is possible to form the beads 52b, 53 in different plates. Such a modified gasket operates as desired.

The metal plate 52 is especially useful for an engine that the bolts are tightened strongly and rigidity of the cylinder head is high.

The metal plates as shown in FIGS. 3–6 are combined with one or more metal plates to constitute the metal laminate gasket.

In the present invention, the lateral side portions of the gasket can be sufficiently supported by the edge support beads. Thus, deformation of the cylinder head is prevented, and the sealing means around the cylinder bores are equally compressed to securely seal therearound.

While the invention has been explained with reference to the specific embodiments of the invention, the explanation is illustrative, and the invention is limited only by the appended claims.

What is claimed is:

1. A metal laminate gasket for an internal combustion engine formed of a cylinder head and a cylinder block, comprising:

at least two metal plates laminated together and extending substantially throughout an entire area of the engine for constituting the metal laminate gasket, said gasket including two longitudinal edges, two lateral edges perpendicular to the longitudinal edges to form a rectangular shape, a plurality of cylinder bores arranged along a longitudinal direction of the gasket, and a plurality of bolt holes arranged to surround the cylinder bores, said gasket having lateral side portions, each being defined between the lateral edge and a line linking centers of bolt holes located adjacent to the lateral edge, and at least two edge support beads integrally formed in at least one of the two plates and having side beads, each edge support bead being formed in the lateral side portion to substantially completely support tightening pressure of the bolts applied to the lateral side portion, each side bead being located in a longitudinal side portion of the gasket defined between the longitudinal edge and a bolt hole adjacent thereto, said side bead extending not to exceed a line extending perpendicularly to the longitudinal direction of the gasket and passing through a center of one cylinder bore located at a longitudinal end of the gasket adjacent to the edge support bead to thereby prevent deformation of the cylinder head and provide substantially equally tightening pressure around the entire cylinder bores.

2. A metal laminate gasket according to claim 1, wherein said edge support bead extends substantially completely along the lateral side portion outside the bolt openings.

3. A metal laminate gasket according to claim 2, wherein said edge support bead is curved to have wave portions to widely cover the lateral side portion.

4. A metal laminate gasket according to claim 3, further including a plurality of small beads located in the lateral side portion without overlapping the wave portions.

5. A metal laminate gasket for an internal combustion engine formed of a cylinder head and a cylinder block, comprising:

at least two metal plates laminated together and extending substantially throughout an entire area of the engine for constituting the metal laminate gasket, said gasket including two longitudinal edges, two lateral edges perpendicular to the longitudinal edges to form a rectangular shape, a plurality of cylinder bores arranged along a longitudinal direction of the gasket, and a plurality of bolt holes arranged to surround the cylinder bores, said gasket having lateral side portions, each being defined between the lateral edge and a line linking centers of bolt holes located adjacent to the lateral edge, and at least two edge support beads integrally formed in at least one of the two plates and having side beads, each edge support bead being formed in the lateral side portion and extending substantially completely along the lateral side portion outside the bolt openings to substantially completely support tightening pressure of the bolts applied to the lateral side portion, each side bead being arranged substantially perpendicularly to and extending continuously from the edge support bead to be located in a longitudinal side portion of the gasket defined between the longitudinal edge and a bolt hole adjacent thereto, said side bead extending not to exceed a line extending perpendicularly to the longitudinal direction of the gasket and passing through a center of one cylinder bore located at a longitudinal end of the gasket adjacent to the edge support bead to thereby prevent deformation of the cylinder head and provide substantially equally tightening pressure around the entire cylinder bores.

6. A metal laminate gasket according to claim 5, wherein said edge support bead is formed of a plurality of first portions extending parallel to the lateral side edge, a plurality of second portions extending parallel to the side bead and connected to the first portions, and semicircular portions connected between the second portions so that the first, second and semicircular portions form one continuous edge support bead.

7. A metal laminate gasket according to claim 6, further comprising a plurality of small beads, each being located between the second portions and between the semicircular portion and the lateral edge.

* * * * *